(12) United States Patent
Thompson

(10) Patent No.: US 10,351,642 B2
(45) Date of Patent: Jul. 16, 2019

(54) FREE-RADICAL POLYMERIZATION METHODS AND ARTICLES THEREBY

(71) Applicant: 3M INNOVATIVE PROPERTIES COMPANY, St. Paul, MN (US)

(72) Inventor: Zachary J. Thompson, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 116 days.

(21) Appl. No.: 15/318,296

(22) PCT Filed: Jun. 29, 2015

(86) PCT No.: PCT/US2015/038291
§ 371 (c)(1),
(2) Date: Dec. 12, 2016

(87) PCT Pub. No.: WO2016/014218
PCT Pub. Date: Jan. 28, 2016

(65) Prior Publication Data
US 2017/0137546 A1    May 18, 2017

Related U.S. Application Data

(60) Provisional application No. 62/027,615, filed on Jul. 22, 2014.

(51) Int. Cl.
*C08F 20/28* (2006.01)
*C08F 4/06* (2006.01)
(Continued)

(52) U.S. Cl.
CPC .......... *C08F 20/28* (2013.01); *B32B 7/12* (2013.01); *B32B 17/061* (2013.01); *C08F 4/06* (2013.01);
(Continued)

(58) Field of Classification Search
None
See application file for complete search history.

(56) References Cited

U.S. PATENT DOCUMENTS 3,347,954 A * 10/1967 Bredereck ............... C08F 2/44
                                                            525/21
4,032,596 A    6/1977 Uffner
(Continued)

FOREIGN PATENT DOCUMENTS

CN    102083917 A    6/2011
CN    103443184 A    12/2013
(Continued)

OTHER PUBLICATIONS

Bredereck, "Autoxidation CH-Active Polymerization Initiators: XIVth Report Polymerizations and Polymerization Inhibitors", Macromolecular Chemistry, 1966, vol. 99, pp. 96-102.
(Continued)

*Primary Examiner* — Nathan T Leong
(74) *Attorney, Agent, or Firm* — Bradford B. Wright

(57) ABSTRACT

A method of curing a free-radically polymerizable composition includes contacting a curable composition with at least one metal oxide selected from the group consisting of magnesium oxide, ferrous metal oxides, aluminum oxide, nickel oxide, silver oxide, and combinations thereof. The curable composition includes: free-radically polymerizable compound; and a beta-dicarbonyl compound represented by the formula (I) or a salt thereof, wherein: $X^1$ and $X^2$ independently represent a covalent bond, wherein each $R^4$ independently represents H or alkyl having from 1 to 18 carbon atoms; $R^1$ and $R^2$ independently represent a hydrocarbyl or substituted-hydrocarbyl group having from 1 to 18 carbon atoms, and $R^3$ represents hydrogen, or a hydrocarbyl
(Continued)

or substituted-hydrocarbyl group having from 1 to 18 carbon atoms, or taken together any two of $R^1$, $R^2$, or $R^3$ form a five-membered or six-membered ring; an organic peroxide; and a quaternary ammonium halide. Articles including the cured compositions are also disclosed.

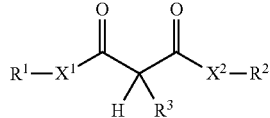

(I)

8 Claims, 1 Drawing Sheet

(51) Int. Cl.
*C08F 4/12* (2006.01)
*C08F 4/26* (2006.01)
*C08F 220/28* (2006.01)
*B32B 7/12* (2006.01)
*B32B 17/06* (2006.01)

(52) U.S. Cl.
CPC .................. *C08F 4/12* (2013.01); *C08F 4/26* (2013.01); *C08F 220/28* (2013.01); *B32B 2255/06* (2013.01); *B32B 2255/26* (2013.01); *B32B 2307/412* (2013.01)

(56) References Cited

U.S. PATENT DOCUMENTS

| | | | |
|---|---|---|---|
| 4,356,296 A | 10/1982 | Griffith | |
| 4,513,127 A | 4/1985 | Jacobine | |
| 4,642,126 A | 2/1987 | Zador | |
| 4,648,843 A | 3/1987 | Mitra | |
| 4,652,274 A | 3/1987 | Boettcher | |
| 4,665,217 A | 5/1987 | Reiners | |
| 4,752,338 A | 6/1988 | Reiners | |
| 5,026,902 A | 6/1991 | Fock | |
| 5,076,844 A | 12/1991 | Fock | |
| 5,252,629 A | 10/1993 | Imai | |
| 6,552,140 B1 | 4/2003 | Kneafsey | |
| 6,852,775 B1* | 2/2005 | Soglowek | A61K 6/0023 523/109 |
| 2003/0069326 A1 | 4/2003 | Stangel | |
| 2003/0215635 A1 | 11/2003 | Johnston | |
| 2009/0192239 A1* | 7/2009 | Hecht | A61K 6/0017 522/166 |
| 2011/0313078 A1 | 12/2011 | Vogt | |
| 2016/0040025 A1 | 2/2016 | Thompson | |

FOREIGN PATENT DOCUMENTS

| | | | |
|---|---|---|---|
| CN | 106459672 A | | 2/2017 |
| EP | 201031 | | 11/1986 |
| EP | 201778 | | 11/1986 |
| EP | 373384 | | 6/1990 |
| EP | 2492329 | | 8/2012 |
| GB | 1293209 | | 10/1972 |
| GB | 1417088 | | 12/1975 |
| JP | 2005-255654 | | 9/2005 |
| JP | 2006-257087 A | | 9/2006 |
| JP | 2009/295895 A | | 12/2009 |
| JP | 2010-215694 A | | 9/2010 |
| WO | 2000-038619 | | 7/2000 |
| WO | 2000-042092 | | 7/2000 |
| WO | 2001-007444 | | 2/2001 |
| WO | 2001-092271 | | 12/2001 |
| WO | 02-77043 | | 10/2002 |
| WO | 2006/053425 A1 | | 5/2006 |
| WO | 2009/141443 A1 | | 11/2009 |
| WO | WO 2009/141443 | * | 12/2009 |
| WO | 2012/126917 A1 | | 9/2012 |
| WO | 2013-126377 | | 8/2013 |
| WO | 2013/126377 A1 | | 8/2013 |
| WO | WO 2013/126377 | * | 12/2013 |
| WO | 2014-151650 | | 9/2014 |
| WO | 2015/200007 A1 | | 12/2015 |

OTHER PUBLICATIONS

Bredereck, "Regarding CH-Active Polymerization Initiators", Macromolecular Chemistry, 1966, vol. 92, pp. 70-90.
Rosen, "Single-Electron Transfer and Single-Electron Transfer Degenerative Chain Transfer Living Radical Polymerization," Chemical Reviews, Jan. 2009, vol. 109, No. 11, pp. 5069-5119.
International Search Report for PCT International Application No. PCT/US2015/038291, dated Sep. 25, 2015, 3 pages.

* cited by examiner

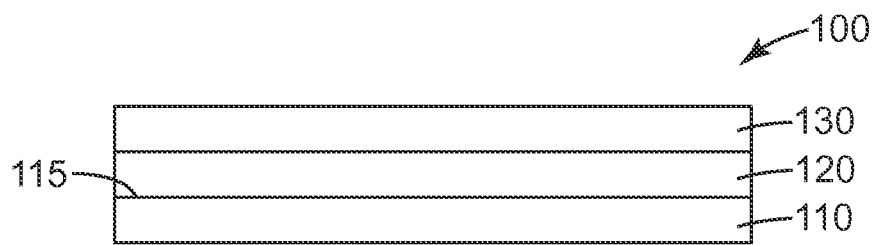

FREE-RADICAL POLYMERIZATION METHODS AND ARTICLES THEREBY

TECHNICAL FIELD

The present disclosure broadly relates to free-radical polymerization and free-radically polymerizable curable compositions.

BACKGROUND

Many vinyl compounds are polymerizable by free-radicals. Examples include acrylates and methacrylates, acrylamides and methacrylamides, allyl ethers, and styrenes.

Free-radical polymerization of vinyl compound(s) using certain beta-dicarbonyl (i.e., 1,3-dicarbonyl) compounds in the presence of a peroxide and/or oxygen, a halide salt, and a copper compound such as copper acetylacetonate, has been described in U.S. Pat. No. 3,347,954 (Bredereck et al.). Such compositions cause free-radical polymerization of the vinyl compound(s) over time, with shorter times generally being preferred. Since the compositions are spontaneously reactive, it is common practice to provide them as a two-part system such as, for example, a part A and a part B that are combined immediately prior to use.

Organometallic compounds such as, for example, cobalt and manganese naphthenates and copper acetylacetonate typically have good solubility in many organic systems. However, a typical problem of including such organometallic compounds in curable compositions is that they are prone to color formation, and may not be suitable for use in applications where absence of color is desirable for aesthetic and/or functional reasons.

SUMMARY

The present inventor has discovered a method of polymerizing vinyl compounds using oxygen-activated free-radical initiator systems wherein a metal oxide-based initiator system is used to initiate cure. Useful metal oxides include metal oxides selected from the group consisting of magnesium oxide, ferrous metal oxides, aluminum oxide, nickel oxide, silver oxide, and combinations thereof. According to the method, polymerization can be achieved with little or no unwanted color associated with soluble organometallic compounds. Further, the method can be practiced in a manner wherein the metal oxide(s) is/are deposited as a very thin (typically optically transparent) layer on a surface of one or more substrates which are then bonded by placing a curable composition between them, thereby causing it to cure. Accordingly, very good pot-life can be achieved, and there is no need for a last-minute mixing step in order to cause polymerization.

In one aspect, the present disclosure provides a method comprising:
a) providing a curable composition comprising:
at least one free-radically polymerizable compound; and
a beta-dicarbonyl compound represented by the formula

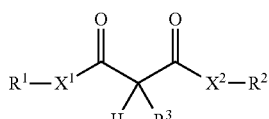

or a salt thereof, wherein:
$X^1$ and $X^2$ independently represent a covalent bond, O, S,

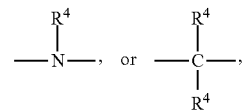

wherein each $R^4$ independently represents H or alkyl having from 1 to 18 carbon atoms,
$R^1$ and $R^2$ independently represent a hydrocarbyl or substituted-hydrocarbyl group having from 1 to 18 carbon atoms,
$R^3$ represents hydrogen, or a hydrocarbyl or substituted-hydrocarbyl group having from 1 to 18 carbon atoms,
or taken together any two of $R^1$, $R^2$, or $R^3$ form a five-membered or six-membered ring;
an organic peroxide; and
a quaternary ammonium halide; and
b) contacting the curable composition with at least one metal oxide selected from the group consisting of magnesium oxide, ferrous metal oxides, aluminum oxide, nickel oxide, silver oxide, and combinations thereof, thereby causing at least partial curing of the curable composition.

In another aspect the present disclosure provides a method of forming an article, the method comprising:
providing a first substrate having a surface, wherein at least a portion of the surface of the first substrate comprises at least one metal oxide selected from the group consisting of magnesium oxide, ferrous metal oxides, aluminum oxide, nickel oxide, silver oxide, and combinations thereof; and
contacting a curable composition with the at least one metal oxide, whereby the curable composition at least partially cures, and wherein the curable composition comprises:
at least one free-radically polymerizable compound; and
a beta-dicarbonyl compound represented by the formula

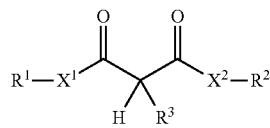

or a salt thereof, wherein:
$X^1$ and $X^2$ independently represent a covalent bond, O, S,

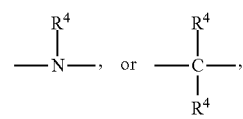

wherein each $R^4$ independently represents H or alkyl having from 1 to 18 carbon atoms,
$R^1$ and $R^2$ independently represent a hydrocarbyl or substituted-hydrocarbyl group having from 1 to 18 carbon atoms, R³ represents hydrogen, or a hydrocarbyl or substituted-hydrocarbyl group having from 1 to 18 carbon atoms, or taken together any two of R¹, R², or R³ form a five-membered or six-membered ring;

an organic peroxide; and a quaternary ammonium halide.

In yet another aspect the present disclosure provides an article comprising:

a first substrate having a surface, wherein at least a portion of the surface of the first substrate comprises at least one metal oxide selected from the group consisting of magnesium oxide, ferrous metal oxides, aluminum oxide, nickel oxide, silver oxide, and combinations thereof; and a reaction product of components comprising:

the at least one metal oxide;

at least one free-radically polymerizable compound; and a beta-dicarbonyl compound represented by the formula

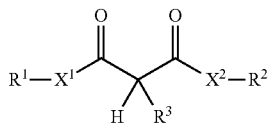

or a salt thereof, wherein:

X¹ and X² independently represent a covalent bond, O, S,

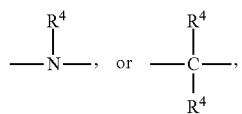

wherein each R⁴ independently represents H or alkyl having from 1 to 18 carbon atoms, R¹ and R² independently represent a hydrocarbyl or substituted-hydrocarbyl group having from 1 to 18 carbon atoms, R³ represents hydrogen, or a hydrocarbyl or substituted-hydrocarbyl group having from 1 to 18 carbon atoms, or taken together any two of R¹, R², or R³ form a five-membered or six-membered ring;

an organic peroxide; and a quaternary ammonium halide.

In yet another aspect the present disclosure provides a method comprising:

a) providing a curable composition comprising:

at least one free-radically polymerizable compound; and a beta-dicarbonyl compound represented by the formula

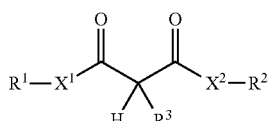

or a salt thereof, wherein:

X¹ and X² independently represent a covalent bond, O, S,

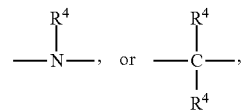

wherein each R⁴ independently represents H or alkyl having from 1 to 18 carbon atoms, R¹ and R² independently represent a hydrocarbyl or substituted-hydrocarbyl group having from 1 to 18 carbon atoms, R³ represents hydrogen, or a hydrocarbyl or substituted-hydrocarbyl group having from 1 to 18 carbon atoms, or taken together any two of R¹, R², or R³ form a five-membered or six-membered ring; and b) contacting the curable composition with silver oxide, thereby causing at least partial curing of the curable composition.

As used herein, the prefix "(meth)acryl" refers to acryl and/or methacryl. For example, (meth)acrylate refers to acrylate and/or methacrylate.

As used herein, the term "hydrocarbyl" refers to a monovalent group derived from a hydrocarbon. Examples include methyl, phenyl, and methylcyclohexyl.

As used herein, the term "hydrocarbylene" refers to a divalent group derived from a hydrocarbon. Examples include methylene, phenylene, and 1,3-propane-diyl.

Features and advantages of the present disclosure will be further understood upon consideration of the detailed description as well as the appended claims.

BRIEF DESCRIPTION OF THE DRAWINGS

FIG. 1 is a schematic side view of an exemplary article according to one embodiment of the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The FIGURES may not be drawn to scale.

DETAILED DESCRIPTION

The present disclosure concerns methods for curing free-radically polymerizable compositions using a metal oxide-based initiator system. The metal oxide includes at least one metal oxide selected from the group consisting of magnesium oxide, ferrous metal oxides, aluminum oxide, nickel oxide, silver oxide, and combinations thereof. Curing is effected by free-radical polymerization once the metal oxide is brought into contact with the curable composition.

The curable composition comprises at least one free-radically polymerizable compound, which may comprise at least one of (meth)acrylates, (meth)acrylamides, other vinyl compounds, and combinations thereof. Useful free-radically polymerizable compounds may comprise an ethylenically-unsaturated compound having one or more (e.g., one, two, three, four, or more) free-radically polymerizable groups.

Examples of suitable (meth)acrylates include mono-, di-, and poly-(meth)acrylates and (meth)acrylamides such as, for example, 1,2,4-butanetriol tri(meth)acrylate, 1,3-butylene glycol di(meth)acrylate, 1,3-propanediol di(meth)acrylate, 1,4-butanediol di(meth)acrylate, 1,4-cyclohexanediol di(meth)acrylate, 1,6-hexanediol di(meth)acrylate, 1,6-hexanediol monomethacrylate monoacrylate, 2-phonexy-ethyl (meth)acrylate, alkoxylated cyclohexanedimethanol di(meth)acrylates, alkoxylated hexanediol di(meth)acrylate, alkoxylated neopentyl glycol di(meth)acrylate, allyl (meth)acrylate, bis[1-(2-(meth)acryloxy)]-p-ethoxyphenyldimethylmethane, bis[1-(3-(meth)acryloxy-2-hydroxy)]-p-propoxyphenyldimethylmethane, caprolactone modified dipentaerythritol hexa(meth)acrylate, caprolactone modified neopentyl glycol hydroxypivalate di(meth)acrylate, cyclohexanedimethanol di(meth)acrylate, diethylene glycol di(meth)acrylate, dipentaerythritol penta(meth)acrylate, dipropylene glycol di(meth)acrylate, ditrimethylolpropane tetra(meth)acrylate, ethoxylated (10) bisphenol A di(meth)acrylate, ethoxylated (20) trimethylolpropane tri(meth)acrylate, ethoxylated (3) bisphenol A di(meth)acrylate, ethoxylated (3) trimethylolpropane tri(meth)acrylate, ethoxylated (30) bisphenol A di(meth)acrylate, ethoxylated (4) bisphenol A di(meth)acrylate, ethoxylated (4) pentaerythritol tetra (meth)acrylate, ethoxylated (6) trimethylolpropane tri(meth)acrylate, ethoxylated (9) trimethylolpropane tri(meth)acrylate, ethoxylated bisphenol A di(meth)acrylate, ethyl (meth)acrylate, ethylene glycol di(meth)acrylate, 2-ethylhexyl (meth)acrylate, glycerol tri(meth)acrylate, hydroxypivalaldehyde modified trimethylolpropane di(meth)acrylate, isobornyl (meth)acrylate, isopropyl (meth)acrylate, methyl (meth)acrylate, neopentyl glycol di(meth)acrylate, n-hexyl (meth)acrylate, pentaerythritol tetra(meth)acrylate, pentaerythritol tri(meth)acrylate, polyethylene glycol (200) di(meth)acrylate, polyethylene glycol (400) di(meth)acrylate, polyethylene glycol (600) di(meth)acrylate, propoxylated (3) glyceryl tri(meth)acrylate, propoxylated (3) trimethylolpropane tri(meth)acrylate, propoxylated (5.5) glyceryl tri(meth)acrylate, propoxylated (6) trimethylolpropane tri(meth)acrylate), propoxylated neopentyl glycol di(meth)acrylate, sorbitol hexa(meth)acrylate, stearyl (meth)acrylate, tetraethylene glycol di(meth)acrylate, tetrahydrofurfuryl (meth)acrylate, tricyclodecanedimethanol di(meth)acrylate, triethylene glycol di(meth)acrylate, trimethylolpropane tri(meth)acrylate, tripropylene glycol di(meth)acrylate, tris(2-hydroxyethyl)isocyanurate tri(meth)acrylate, (meth)acrylamide, N,N-dimethylacrylamide, N-vinylpyrrolidone, N-vinylcaprolactam, methylene bis (meth)acrylamide, diacetone (meth)acrylamide, urethane (meth)acrylates, polyester (meth)acrylates, epoxy (meth)acrylates, copolymerizable mixtures of (meth)acrylated monomers such as those in U.S. Pat. No. 4,652,274 (Boettcher et al.), (meth)acrylated oligomers such as those of U.S. Pat. No. 4,642,126 (Zador et al.), and poly(ethylenically-unsaturated) carbamoyl isocyanurates such as those disclosed in U.S. Pat. No. 4,648,843 (Mitra).

Examples of suitable free-radically polymerizable vinyl compounds include styrene, diallyl phthalate, divinyl succinate, divinyl adipate, and divinyl phthalate. Other suitable free-radically polymerizable compounds include siloxane-functional (meth)acrylates as disclosed, for example, in WO 00/38619 (Guggenberger et al.), WO 01/92271 (Weinmann et al.), WO 01/07444 (Guggenberger et al.), WO 00/42092 (Guggenberger et al.), and fluoropolymer-functional (meth) acrylates as disclosed, for example, in U.S. Pat. No. 5,076,844 (Fock et al.), U.S. Pat. No. 4,356,296 (Griffith et al.), EP 0 373 384 (Wagenknecht et al.), EP 0 201 031 (Reiners et al.), and EP 0 201 778 (Reiners et al.).

Suitable free-radically polymerizable compounds may contain hydroxyl groups and free-radically active functional groups in a single molecule. Examples of such materials include hydroxyalkyl (meth)acrylates such as 2-hydroxyethyl (meth)acrylate and 2-hydroxypropyl (meth)acrylate, glycerol mono- or di-(meth)acrylate, trimethylolpropane mono- or di-(meth)acrylate, pentaerythritol mono-, di-, and tri-(meth)acrylate, sorbitol mono-, di-, tri-, tetra-, or penta-(meth)acrylate, and 2,2-bis[4-(2-hydroxy-3-methacryloxypropoxy)phenyl]-propane (bisGMA).

Suitable free-radically polymerizable compounds are available from a wide variety of commercial sources such as, for example, Sartomer Co., Exton, Pa., or can be made by known methods.

Typically, the curable composition includes a sufficient quantity of free-radically polymerizable compound(s) to provide the desired setting or hardening rate and desired overall properties following curing/hardening. Mixtures of free-radically polymerizable compounds can be used if desired.

The curable composition comprises a beta-dicarbonyl compound represented by the formula

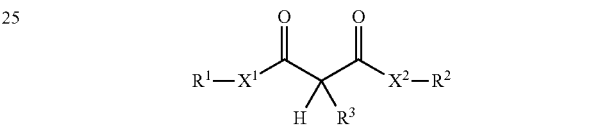

or a salt thereof.

$R^1$ and $R^2$ may independently represent a hydrocarbyl group, or a substituted-hydrocarbyl group, having from 1 to 18 carbon atoms. Preferably, $R^1$ and $R^2$ each have from 1 to 12 carbon atoms, more preferably 1 to 8 carbon atoms, and even more preferably 1 to 4 carbon atoms. Exemplary groups $R^1$ and $R^2$ include methyl, ethyl, isopropyl, n-propyl, butyl, pentyl, hexyl, octyl, decyl, dodecyl, hexadecyl, and octadecyl. Generally, the nature of the substituents in the substituted-hydrocarbyl groups (which may be mono-substituted or poly-substituted) is not particularly important, except that substituents that interfere with the free-radical polymerization should be used sparingly or excluded altogether. Exemplary substituted-hydrocarbyl groups include hydroxyhydrocarbyl groups (e.g., hydroxyethyl and hydroxypropyl), alkoxyhydrocarbyl groups (e.g., methoxyethyl and methoxyethoxy), alkanoylhydrocarbyl groups (e.g., acetylethyl and benzoylethyl), haloalkyl groups (e.g., chloroethyl and dichloropropyl), and dialkylaminohydrocarbyl groups (e.g., dimethylaminopropyl and diethylaminoethyl).

In some embodiments, any two of $R^1$, $R^2$, and $R^3$ taken together form a five-membered or six-membered ring.

In those embodiments, two of $R^1$, $R^2$ and $R^3$ taken together may represent, for example: a divalent group selected from

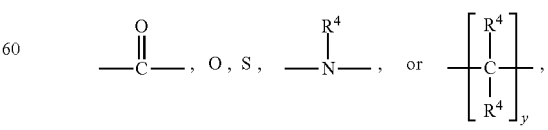

and combinations thereof, wherein each $R^4$ independently represents H or an alkyl group having from 1 to 18 carbon atoms (preferably an alkyl group having from 1 to 12 carbon atoms, more preferably from 1 to 8 carbon atoms, and more preferably from 1 to 4 carbon atoms), and y is 1, 2, or 3. Exemplary groups $R^4$ include hydrogen, methyl, ethyl, isopropyl, n-propyl, butyl, pentyl, hexyl, octyl, decyl, dodecyl, hexadecyl, and octadecyl. Examples of divalent groups formed by two of $R^1$, $R^2$ and $R^3$ taken together include alkylene, alkyleneoxy, oxycarbonyloxy, carbonylalkylene, alkylenecarbonyloxy, alkyleneoxycarbonyl, alkylene(alkyl) amino, and dialkylene(alkyl)amino. If $R^1$ and $R^2$ taken together form a 5-membered ring, then at least one of $X^1$ or $X^2$ is a covalent bond.

$R^3$ may represent hydrogen or a hydrocarbyl group having from 1 to 18 carbon atoms. Exemplary groups $R^3$ include methyl, ethyl, isopropyl, n-propyl, butyl, pentyl, hexyl, octyl, decyl, dodecyl, hexadecyl, phenyl, cyclohexyl, methylcyclohexyl, and octadecyl.

Each of $X^1$ and $X^2$ independently represents a covalent bond, O, S,

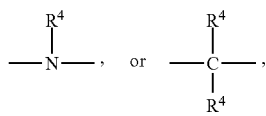

wherein $R^4$ is as described above.

In some embodiments, the beta-dicarbonyl compound comprises barbituric acid (i.e., $R^3$=H, both of $X^1$ and

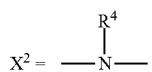

wherein $R^4$=H, and taken together $R^1$ and $R^2$=carbonyl) or a derivative thereof (e.g., a 1,3-dialkylbarbituric acid). Examples of suitable barbituric acid derivatives include 1,3,5-trimethylbarbituric acid, 1,3,5-triethylbarbituric acid, 1,3-dimethyl-5-ethylbarbituric acid, 1,5-dimethylbarbituric acid, 1-methyl-5-ethylbarbituric acid, 1-methyl-5-propylbarbituric acid, 5-ethylbarbituric acid, 5-propylbarbituric acid, 5-butylbarbituric acid, 1-benzyl-5-phenylbarbituric acid, and 1-cyclohexyl-5-ethylbarbituric acid.

Optionally, but preferably, the curable composition may further comprise one or more organic peroxides (e.g., mono- or multi-functional carboxylic acid peroxyesters), which typically act to decrease the cure time of the curable composition. Commercially available organic peroxides include, for example, t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids, dialkyl peroxydicarbonates, and OO-t-alkyl O-alkyl diesters of monoperoxycarbonic acid. Exemplary organic peroxides include diisopropyl peroxydicarbonate, t-butyl peroxyneodecanoate, t-amyl peroxyneodecanoate, maleic acid t-butyl monoperoxyester, t-butyl peroxybenzoate, t-butyl peroxy-2-ethylhexanoate, t-amyl peroxy-2-ethylhexanoate, O-isopropyl O,O-t-butyl monoperoxycarbonate, dicyclohexyl peroxycarbonate, dimyristyl peroxycarbonate, dicetyl peroxycarbonate, di(2-ethylhexyl) peroxycarbonate, O,O-t-butyl O-2-ethylhexyl peroxycarbonate, t-butyl peroxy-3,5,5-trimethylhexanoate, t-amyl peroxybenzoate, t-butyl peroxyacetate, di(4-t-butylcyclohexyl) peroxycarbonate, cumyl peroxyneodecanoate, t-amyl peroxypivalate, and t-butyl peroxypivalate. Further suitable organic peroxides will be known to one of ordinary skill in the art.

In some embodiments (e.g., in the case that at least one metal oxide is silver oxide), the curable composition may contain little or no organic peroxide. For example the curable composition may be essentially free of (e.g., contain less than 1 percent by weight of, less than 0.1 percent by weight of, or even contain less than 0.01 percent by weight of) organic peroxide.

Optionally, but preferably, the curable composition further comprises a quaternary ammonium halide that is at least partially soluble in the curable composition. The quaternary ammonium halide may accelerate the free-radical polymerization rate. Suitable quaternary ammonium halides include those having four hydrocarbyl (e.g., alkyl, alkenyl, cycloalkyl, aralkyl, alkaryl, and/or aryl) groups. Preferably, the hydrocarbyl groups are independently selected from hydrocarbyl groups having from 1 to 18 carbon atoms, more preferably 1 to 12 carbon atoms, and more preferably 1 to 4 carbon atoms. Examples of suitable hydrocarbyl groups include methyl, ethyl, propyl, butyl, hexyl, octyl, dodecyl, hexadecyl, and octadecyl, benzyl, phenyl, tolyl, cyclohexyl, and methylcyclohexyl. Exemplary suitable quaternary ammonium compounds include tetramethylammonium halides, tetraethylammonium halides, tetrapropylammonium halides, tetrabutylammonium halides, ethyltrimethylammonium halides, diethyldimethylammonium halides, trimethylbutylammonium halides, and benzyltributylammonium halides. Any halide (e.g., F, Cl, Br, I) ion may be used in the quaternary ammonium halide, but preferably the halide ion is chloride or bromide. In the case that at least one metal oxide is silver oxide, the curable composition may not contain a quaternary ammonium halide that is at least partially soluble in the curable composition), although this is not a requirement.

Curable compositions according to the present disclosure may optionally include additives such, as for example, one or more fillers, thickeners, fragrances, hindered amine light stabilizers (HALS), UV stabilizers, inhibitors (e.g., which may accompany free-radically polymerizable compounds), coating aids, thixatropes, coupling agents, toughening agents, or a combination thereof. Examples of fillers include silica, clays, and surface modified clays. Exemplary toughening agents include elastomeric materials such as various synthetic rubbers (e.g., methyl methacrylate-butadiene-styrene (MBS) copolymers, acrylonitrile-butadiene-styrene (ABS) copolymers, linear polyurethanes, acrylonitrile-butadiene rubbers, styrene-butadiene rubbers, chloroprene rubbers, butadiene rubbers, and natural rubbers. Among them, acrylonitrile-butadiene rubbers are particularly useful because of their typically good solubility in the curable composition. Tougheners may be used alone or in combination.

The curable composition is brought into contact with at least one metal oxide selected from the group consisting of magnesium oxide, ferrous metal oxides, aluminum oxide, nickel oxide, silver oxide, and combinations thereof, to cause at least partial curing of the curable composition. The above metal oxides are readily available commercially, typically as fine powder or crystals, or they can be milled to that form if desired. Optionally, heating of the curable composition while in contact with the at least one metal oxide may be carried out, although this is generally not necessary.

Exemplary useful metal oxides include aluminum oxide (e.g., as powder or as a coating on aluminum metal or other substrate), nickel oxide (e.g., as powder or as a coating on nickel metal or other substrate (e.g., nickel-coated stainless steel)), silver oxide (e.g., as powder or as a coating on silver metal or other substrate), magnesium oxide (e.g., as powder or as a coating on magnesium metal or other substrate), iron oxide and oxides of ferrous metal alloys (e.g., steel and stainless steel, whether as powder or as a coating on the iron or ferrous metal alloy or other substrate). Exemplary substrates include silica, glass (e.g., as sheets, beads, or bubbles), plastic films, and fibers.

In some embodiments, the at least one metal oxide is provided as an oxide layer on the surface of the corresponding metal or alloy. This may be highly advantageous depending on the application. For example, if using the curable composition to encapsulate a silver electrical circuit trace or silver wire, the silver oxide is already present on the surface of the silver and need not be imaged. Similarly, techniques for vapor deposition of metals (e.g., by sputtering, electroless plating, or thermal vapor deposition) are well known in the art, and after brief exposure to atmospheric oxygen will develop the corresponding metal oxide as a layer on their surface. The resultant metal and/or oxide films are typically highly uniform and can be made to virtually any thickness. In some useful embodiments, vapor-deposited metal and/or metal oxide films are essentially optically transparent at visible wavelengths, yet they are still effective to at least partially cure the curable composition. Vapor deposited metal films between about 1 nm and about 70 nm in thickness are typically transparent, although other thicknesses may also be transparent.

Accordingly, in one useful embodiment, a selected metal is disposed on a surface of a substrate (e.g., by vapor deposition, lamination, or electroless plating), wherein a corresponding metal oxide layer spontaneously forms in air, resulting in the substrate having a layer of metal oxide on at least a portion of its surface. Of course, if the substrate itself is made of the selected metal, that metal oxide will already be disposed on the surface. The curable composition is contacted with (e.g., coated onto) the metal oxide, thereby causing at least partial curing. Any uncured material can be removed, if desired, for example, by rinsing with solvent or by evaporation.

In another useful embodiment, a selected metal (with its associated metal oxide surface layer) is disposed adjacent to a surface of a first substrate (e.g., by vapor deposition, lamination, or electroless plating). The curable composition is coated on a surface of second substrate, and the two substrates are brought together so as to sandwich the curable composition therebetween (i.e., the curable composition contacts both substrates and disposed between them), thereby causing curing of the curable composition and bonding the two substrates together, as shown in FIG. 1.

Referring now to FIG. 1, composite article 100 comprises first substrate 110 having surface 115 comprising at least one metal oxide selected from the group consisting of magnesium oxide, ferrous metal oxides, aluminum oxide, nickel oxide, silver oxide, and combinations thereof, and optional second substrate 130. Layer 120 comprising a reaction product of the curable composition and the above at least one metal oxide is disposed on surface 115. Layer 120 is disposed between first substrate 110 and second substrate 130.

Exemplary substrates useful in practicing the above embodiments include glass (e.g., as plates, sheets, windows, or electronic display windows (e.g., LCD display or plasma display), flexible circuits, circuit boards, plumbing, plastic films or sheets (e.g., acrylonitrile-butadiene-styrene (ABS) plastic, polycarbonate, or polyester), metal, ceramic, silicon, and substrates made of (or having surface coatings of) magnesium, ferrous metals, aluminum, nickel, or silver, or a combination thereof.

SELECT EMBODIMENTS OF THE PRESENT DISCLOSURE

In a first embodiment, the present disclosure provides a method comprising:
a) providing a curable composition comprising:
at least one free-radically polymerizable compound; and
a beta-dicarbonyl compound represented by the formula

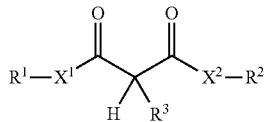

or a salt thereof, wherein:
$X^1$ and $X^2$ independently represent a covalent bond, O, S,

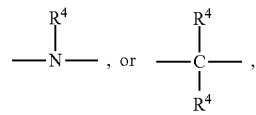

wherein each $R^4$ independently represents H or alkyl having from 1 to 18 carbon atoms,
$R^1$ and $R^2$ independently represent a hydrocarbyl or substituted-hydrocarbyl group having from 1 to 18 carbon atoms,
$R^3$ represents hydrogen, or a hydrocarbyl or substituted-hydrocarbyl group having from 1 to 18 carbon atoms,
or taken together any two of $R^1$, $R^2$, or $R^3$ form a five-membered or six-membered ring;
an organic peroxide; and
a quaternary ammonium halide; and
b) contacting the curable composition with at least one metal oxide selected from the group consisting of magnesium oxide, ferrous metal oxides, aluminum oxide, nickel oxide, silver oxide, and combinations thereof, thereby causing at least partial curing of the curable composition.

In a second embodiment, the present disclosure provides a method according to the first embodiment, wherein the beta-dicarbonyl compound comprises a 1,3-dialkylbarbituric acid or a derivative thereof.

In a third embodiment, the present disclosure provides a method according to the first or second embodiment, wherein the at least one free-radically polymerizable compound comprises a free-radically polymerizable polyfunctional (meth)acrylate.

In a fourth embodiment, the present disclosure provides a method according to any one of the first to third embodiments, wherein the at least one metal oxide comprises iron oxide.

In a fifth embodiment, the present disclosure provides a method according to any one of the first to fourth embodiments, wherein the at least one metal oxide is present as fine particles.

In a sixth embodiment, the present disclosure provides a method of forming an article, the method comprising:
providing a first substrate having a surface, wherein at least a portion of the surface of the first substrate comprises at least one metal oxide selected from the group consisting of magnesium oxide, ferrous metal oxides, aluminum oxide, nickel oxide, silver oxide, and combinations thereof; and
contacting a curable composition with the at least one metal oxide, whereby the curable composition at least partially cures, and wherein the curable composition comprises:
at least one free-radically polymerizable compound; and
a beta-dicarbonyl compound represented by the formula

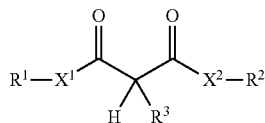

or a salt thereof, wherein:
$X^1$ and $X^2$ independently represent a covalent bond, O, S,

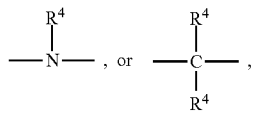

wherein each $R^4$ independently represents H or alkyl having from 1 to 18 carbon atoms,
$R^1$ and $R^2$ independently represent a hydrocarbyl or substituted-hydrocarbyl group having from 1 to 18 carbon atoms,
$R^3$ represents hydrogen, or a hydrocarbyl or substituted-hydrocarbyl group having from 1 to 18 carbon atoms,
or taken together any two of $R^1$, $R^2$, or $R^3$ form a five-membered or six-membered ring;
an organic peroxide; and
a quaternary ammonium halide.

In a seventh embodiment, the present disclosure provides a method according to the sixth embodiment, wherein the at least one metal oxide comprises iron oxide.

In an eighth embodiment, the present disclosure provides a method according to the sixth or seventh embodiment, further comprising:
contacting the curable composition with a second substrate such that the curable composition is at least partially disposed between the first substrate and the second substrate.

In a ninth embodiment, the present disclosure provides a method according to any one of the sixth to eighth embodiments, wherein the second substrate comprises glass.

In a tenth embodiment, the present disclosure provides a method according to any one of the sixth to ninth embodiments, wherein the first substrate further comprises glass.

In an eleventh embodiment, the present disclosure provides a method according to any one of the sixth to tenth embodiments, wherein the at least one metal oxide comprises at least a portion of a printed circuit.

In a twelfth embodiment, the present disclosure provides a method according to any one of the sixth to eleventh embodiments, wherein the at least one metal oxide is substantially optically transparent.

In a thirteenth embodiment, the present disclosure provides a method according to any one of the sixth to twelfth embodiments, wherein the beta-dicarbonyl compound comprises a 1,3-dialkylbarbituric acid or a derivative thereof.

In a fourteenth embodiment, the present disclosure provides a method according to any one of the sixth to thirteenth embodiments, wherein the at least one free-radically polymerizable compound comprises a free-radically polymerizable polyfunctional (meth)acrylate.

In a fifteenth embodiment, the present disclosure provides an article comprising:
a first substrate having a surface, wherein at least a portion of the surface of the first substrate comprises at least one metal oxide selected from the group consisting of magnesium oxide, ferrous metal oxides, aluminum oxide, nickel oxide, silver oxide, and combinations thereof; and
a reaction product of components comprising:
the at least one metal oxide;
at least one free-radically polymerizable compound; and
a beta-dicarbonyl compound represented by the formula

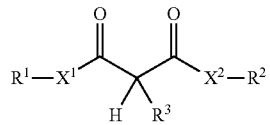

or a salt thereof, wherein:
$X^1$ and $X^2$ independently represent a covalent bond, O, S,

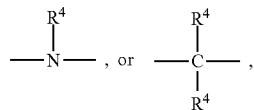

wherein each $R^4$ independently represents H or alkyl having from 1 to 18 carbon atoms,
$R^1$ and $R^2$ independently represent a hydrocarbyl or substituted-hydrocarbyl group having from 1 to 18 carbon atoms,
$R^3$ represents hydrogen, or a hydrocarbyl or substituted-hydrocarbyl group having from 1 to 18 carbon atoms,
or taken together any two of $R^1$, $R^2$, or $R^3$ form a five-membered or six-membered ring;
an organic peroxide; and
a quaternary ammonium halide.

In a sixteenth embodiment, the present disclosure provides an article according to the fifteenth embodiment, wherein the reaction product contacts a second substrate, and wherein the reaction product is at least partially disposed between the first substrate and the second substrate.

In a seventeenth embodiment, the present disclosure provides an article according to the fifteenth or sixteenth embodiment, wherein the second substrate comprises glass.

In an eighteenth embodiment, the present disclosure provides an article according to any one of the fifteenth to seventeenth embodiment, wherein the first substrate further comprises glass.

In a nineteenth embodiment, the present disclosure provides an article according to any one of the fifteenth to eighteenth embodiment, wherein the at least one metal oxide comprises at least a portion of a printed circuit.

In a twentieth embodiment, the present disclosure provides an article according to any one of the fifteenth to nineteenth embodiment, wherein the at least one metal oxide is substantially optically transparent.

In a twenty-first embodiment, the present disclosure provides an article according to any one of the fifteenth to twentieth embodiments, wherein the article comprises an electronic display device.

In a twenty-second embodiment, the present disclosure provides an article according to any one of the fifteenth to twenty-first embodiments, wherein the beta-dicarbonyl compound comprises a 1,3-dialkylbarbituric acid or a derivative thereof.

In a twenty-third embodiment, the present disclosure provides an article according to any one of the fifteenth to twenty-second embodiments, wherein the at least one free-radically polymerizable compound comprises a free-radically polymerizable polyfunctional (meth)acrylate.

In a twenty-fourth embodiment, the present disclosure provides a method comprising:
a) providing a curable composition comprising:
at least one free-radically polymerizable compound; and
a beta-dicarbonyl compound represented by the formula

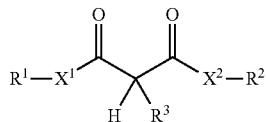

or a salt thereof, wherein:
$X^1$ and $X^2$ independently represent a covalent bond, O, S,

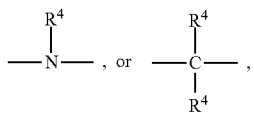

wherein each $R^4$ independently represents H or alkyl having from 1 to 18 carbon atoms,
$R^1$ and $R^2$ independently represent a hydrocarbyl or substituted-hydrocarbyl group having from 1 to 18 carbon atoms, $R^3$ represents hydrogen, or a hydrocarbyl or substituted-hydrocarbyl group having from 1 to 18 carbon atoms,
or taken together any two of $R^1$, $R^2$, or $R^3$ form a five-membered or six-membered ring; and
b) contacting the curable composition with silver oxide, thereby causing at least partial curing of the curable composition.

In a twenty-fifth embodiment, the present disclosure provides a method according to the twenty-fourth embodiment, wherein the silver oxide is present as fine particles.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Table 1 (below) lists materials used in the Examples.

TABLE 1

| DESIGNATION (IF ANY) | DESCRIPTION AND SOURCE |
|---|---|
| | 1-benzyl-5-phenylbarbituric acid, available from TCI (Shanghai) Development Co., Ltd., Shanghai, China |
| Amm Cl | benzyltributylammonium chloride |
| HEMA | 2-hydroxyethyl methacrylate, an acrylate monomer, available from Alfa Aesar, Ward Hill, Massachusetts |
| THFMA | tetrahydrofurfuryl methacrylate, an acrylate monomer, available from Sartomer Co., Exton, Pennsylvania |
| | t-butyl 3,5,5-trimethylperoxyhexanoate, available from Acros Organics, Antwerp, Belgium |
| | BENZOFLEX 9-88 plasticizer, obtained from Eastman Chemical Co., Kingsport, Tennessee |
| | CAB-O-SIL TS-720 hydrophobic treated fumed silica, obtained from Cabot Corp., Boston, Massachusetts |

Preparation of Compositions A-J

Each of base resin compositions A-J contained a polymerizable methacrylate monomer, an ammonium halide salt, and, optionally, metal oxide particles. The compositions were prepared using the amounts listed in Table 2 (below).

TABLE 2

| | COMPOSITION, parts by weight of components | | | | | | | | | |
|---|---|---|---|---|---|---|---|---|---|---|
| COMPONENT | A | B | C | D | E | F | G | H | I | J |
| THFMA | 93 | | 93 | | 93 | | 93 | | 93 | |
| HEMA | 4.75 | 97.75 | 4.75 | 97.75 | 4.75 | 97.75 | 4.75 | 97.75 | 4.75 | 97.75 |
| Amm Cl | 0.25 | 0.25 | 0.25 | 0.25 | 0.25 | 0.25 | 0.25 | 0.25 | 0.25 | 0.25 |
| Ferric Oxide | | | 2 | 2 | | | | | | |
| Aluminum Oxide | | | | | 2 | 2 | | | | |
| Magnesium Oxide | | | | | | | 2 | 2 | | |
| Silver Oxide | | | | | | | | | 2 | 2 |

Preparation of Compositions K and L

Each initiator composition was composed of a diluent, a thixotropic agent, an initiator molecule, and optionally an organic peroxide. The components of the compositions were mixed in cups using a MAX 100 DAC SPEEDMIXER from FlackTek Inc., Landrum, S.C., for 30 seconds at 2000 revolutions per minute (rpm) and 30 seconds at 2500 rpm. The cups were checked to ensure the initiator molecule and the thixotrope were fully dissolved/dispersed. The formulations of Compositions J and K are reported in Table 3 (below).

TABLE 3

| COMPONENT | COMPOSITION, weight percent of components | |
|---|---|---|
| | K | L |
| BENZOFLEX 9-88 | 86 | 84 |
| CAB-O-SIL TS720 | 2.3 | 2.5 |
| 1-benzyl-5-phenylbarbituric acid | 11.7 | 11 |
| t-butylperoxy-3,5,5-trimethylhexanoate | 0 | 2.5 |

Examples 1-8 and Comparative Examples A-B

For Examples 1-8, the indicated base resin compositions (4 mL) and initiator compositions (0.4 mL) were mixed in a small vial. The vials were shaken until the initiator compositions were fully mixed and the components were dissolved or well-dispersed. For comparative examples A-B, metal oxide particles were omitted. Full cure of the resin was established when the material was fully solidified and unable to flow.

The cure times are reported in Table 4 (below).

TABLE 4

| | INITIATOR COMPOSITION | BASE RESIN COMPOSITION | METAL OXIDE | CURE TIME, MINUTES |
|---|---|---|---|---|
| COMPARATIVE EXAMPLE A | L | A | None | 180 |
| COMPARATIVE EXAMPLE B | L | B | None | 60 |
| EXAMPLE 1 | L | C | Ferric Oxide | 80 |
| EXAMPLE 2 | L | D | Ferric Oxide | 120 |
| EXAMPLE 3 | L | E | Aluminum Oxide | 30 |
| EXAMPLE 4 | L | F | Aluminum Oxide | 75 |
| EXAMPLE 5 | L | G | Magnesium Oxide | 30 |
| EXAMPLE 6 | L | H | Magnesium Oxide | 40 |
| EXAMPLE 7 | L | I | Silver Oxide | 60 |
| EXAMPLE 8 | L | J | Silver Oxide | 30 |

Examples 9-24 and Comparative Examples C-D

For Examples 9-24, the indicated base resin composition (4 mL) and initiator composition (0.4 mL) were mixed in a small vial. For Examples 9-12, three drops of the curable mixture were placed on a 0.063 inch (0.15 cm) thick rectangular stainless steel bar and then covered with a glass cover slip.

For Examples 13-16, three drops of the curable mixture were placed on a 0.063 inch (0.15 cm) thick rectangular aluminum bar and then covered with a glass cover slip.

For Examples 17-20, three drops of the curable mixture were placed on a 0.063 inch (0.15 cm) thick rectangular magnesium bar and then covered with a glass cover slip.

For Examples 21-24, three drops of the curable mixture were placed on a 0.045 inch (0.11 cm) thick rectangular nickel-coated stainless steel bar and then covered with a glass cover slip.

For Comparative Examples C and D, three drops of the curable mixture were placed on 0.4 inch (0.1 cm) thick PGO glass slides and then covered with a glass cover slip.

Each substrate was wiped with isopropanol, and allowed to dry in air for 30 minutes before the curable mixture was added. Cure time for each example was established when the glass cover slip could be pushed by hand and not move across the substrate.

The cure times are reported in Table 5 (below).

TABLE 5

| | METAL SUBSTRATE | INITIATOR COMPOSITION | BASE RESIN COMPOSITION | CURE TIME, MINUTES |
|---|---|---|---|---|
| EXAMPLE 9 | Stainless Steel | K | A | 25 |
| EXAMPLE 10 | Stainless Steel | L | A | 25 |
| EXAMPLE 11 | Stainless Steel | K | B | 5 |
| EXAMPLE 12 | Stainless Steel | L | B | 5 |
| EXAMPLE 13 | Aluminum | K | A | 35 |
| EXAMPLE 14 | Aluminum | L | A | 35 |
| EXAMPLE 15 | Aluminum | K | B | 5 |
| EXAMPLE 16 | Aluminum | L | B | 5 |
| EXAMPLE 17 | Magnesium | K | A | 25 |
| EXAMPLE 18 | Magnesium | L | A | 25 |
| EXAMPLE 19 | Magnesium | K | B | 15 |
| EXAMPLE 20 | Magnesium | L | B | 20 |
| EXAMPLE 21 | Nickel-Coated Stainless Steel | K | A | 30 |
| EXAMPLE 22 | Nickel-Coated Stainless Steel | L | A | 30 |
| EXAMPLE 23 | Nickel-Coated Stainless Steel | K | B | 15 |
| EXAMPLE 24 | Nickel-Coated Stainless Steel | L | B | 25 |
| COMPARATIVE EXAMPLE C | none | L | A | 35 |
| COMPARATIVE EXAMPLE D | none | L | B | 5 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:
1. A method comprising:
   a) providing a curable composition comprising:
      at least one free-radically polymerizable compound; and
      a beta-dicarbonyl compound represented by the formula

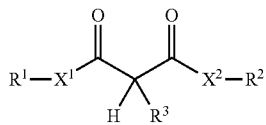

or a salt thereof, wherein:

$X^1$ and $X^2$ independently represent a covalent bond, O, S,

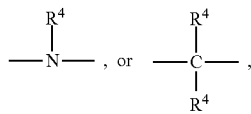

wherein each $R^4$ independently represents H or alkyl having from 1 to 18 carbon atoms, $R^1$ and $R^2$ independently represent a hydrocarbyl or substituted-hydrocarbyl group having from 1 to 18 carbon atoms, $R^3$ represents hydrogen, or a hydrocarbyl or substituted-hydrocarbyl group having from 1 to 18 carbon atoms, or taken together any two of $R^1$, $R^2$, or $R^3$ form a five-membered or six-membered ring;

an organic peroxide; and a quaternary ammonium halide; and b) contacting the curable composition with at least one metal oxide selected from the group consisting of magnesium oxide, ferrous metal oxides, nickel oxide, silver oxide, and combinations thereof, thereby causing at least partial curing of the curable composition.

2. The method of claim 1, wherein the beta-dicarbonyl compound comprises a 1,3-dialkylbarbituric acid or a derivative thereof.

3. The method of claim 1, wherein the at least one free-radically polymerizable compound comprises a free-radically polymerizable polyfunctional (meth)acrylate.

4. The method of claim 1, wherein the at least one metal oxide is present as fine particles.

5. A method of forming an article, the method comprising:

providing a first substrate having a surface, wherein at least a portion of the surface of the first substrate comprises at least one metal oxide selected from the group consisting of magnesium oxide, ferrous metal oxides, nickel oxide, silver oxide, and combinations thereof; and contacting a curable composition with the at least one metal oxide, whereby the curable composition at least partially cures, and wherein the curable composition comprises:

at least one free-radically polymerizable compound; and a beta-dicarbonyl compound represented by the formula

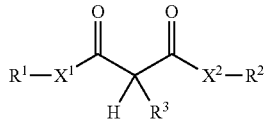

or a salt thereof, wherein:

$X^1$ and $X^2$ independently represent a covalent bond, O, S,

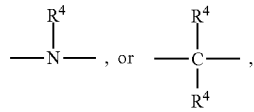

wherein each $R^4$ independently represents H or alkyl having from 1 to 18 carbon atoms, $R^1$ and $R^2$ independently represent a hydrocarbyl or substituted-hydrocarbyl group having from 1 to 18 carbon atoms, $R^3$ represents hydrogen, or a hydrocarbyl or substituted-hydrocarbyl group having from 1 to 18 carbon atoms, or taken together any two of $R^1$, $R^2$, or $R^3$ form a five-membered or six-membered ring;

an organic peroxide; and a quaternary ammonium halide.

6. The method of claim 5, further comprising:

contacting the curable composition with a second substrate such that the curable composition is at least partially disposed between the first substrate and the second substrate.

7. The method of claim 5, wherein the beta-dicarbonyl compound comprises a 1,3-dialkylbarbituric acid or a derivative thereof.

8. The method of claim 7, wherein the at least one free-radically polymerizable compound comprises a free-radically polymerizable polyfunctional (meth)acrylate.

* * * * *